Nov. 12, 1968         HIROSHI SUMITOMO         3,410,827
LINEAR POLYMER OF β-CYANOPROPIONALDEHYDE
Filed April 11, 1966                       6 Sheets-Sheet 1

INVENTOR.
HIROSHI SUMITOMO

BY Kurt Kelman

AGENT

United States Patent Office 3,410,827
Patented Nov. 12, 1968

3,410,827
LINEAR POLYMER OF β-CYANO-
PROPIONALDEHYDE
Hiroshi Sumitomo, Osaka, Japan, assignor to
Ajinomoto Co., Inc., Tokyo, Japan
Filed Apr. 11, 1966, Ser. No. 541,728
Claims priority, application Japan, Apr. 12, 1965,
40/21,189
3 Claims. (Cl. 260—67)

ABSTRACT OF THE DISCLOSURE

A linear polymer of β-cyanopropionaldehyde having repeating units of the formula

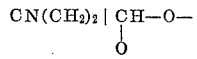

Figure 1:
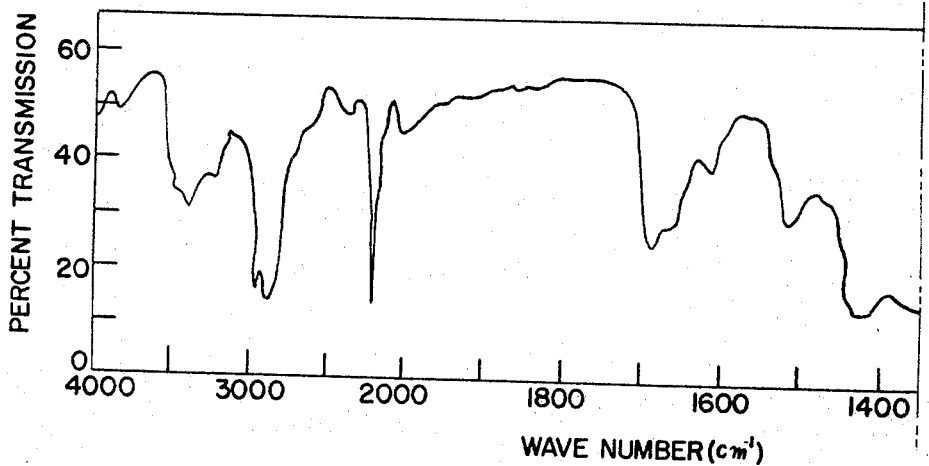

connected by acetal linkages, and a process for preparing the same by a Lewis acid or organometallic compound of Group I–IV metals initiator. The new polymer is useful as the basic component of molding compositions.

---

The present invention relates to the polymerization of β-cyanopropionaldehyde, and particularly a linear polymer of β-cyanopropionaldehyde of the polyacetal type.

An object of the present invention is to provide an additional industrial use for β-cyanopropionaldehyde which is a known intermediate in the synthesis of glutamic acid from acrylonitrile.

A further object of the invention is to provide a new class of linear polymers having polyacetal linkages.

The new polymers are useful as the basic components of molding compositions when the molded parts are required to combine high mechanical strength at low temperatures with toughness and resistance to organic compounds. The molding compositions are formulated as is customary with acetal resins. The polymers of the invention can be converted to sheets and films in the usual manner. The films are transparent and very strong so as to be suitable for packaging.

It has been known that white crystals are formed when sulfuric acid is added to β-cyanopropionaldehyde drop by drop. The crystals were believed to be the tetramer corresponding to metaldehyde, but we have found the crystals to be a cyclic trimer, 2,4,6-tris (β-cyanoethyl) trioxane which corresponds to paraldehyde.

We have also found that β-cyanopropionaldehyde readily forms a linear polymer at temperatures below 10° C. in the presence of Lewis acids, such as boron fluoride, or organometallic compounds, such as triethylaluminum, triethylaluminum-titanium tetrachloride complexes, or diethylzinc, as initiators.

Suitable Lewis acid initiators for the linear polymerization of β-cyanopropionaldehyde include weak acids, such as phosphoric acid, trifluoroacetic acid, trichloroacetic acid, and halides, such as boron fluoride, boron trifluoride diethyl etherate, titanium tetrachloride, titanium trichloride, stannic chloride, ferric chloride, aluminum chloride, arsenic tetrachloride, arsenic trichloride, zinc chloride and other known cationic polymerization catalysts. Among these Lewis acids, boron trifluoride diethyl etherate has been found to be most suitable.

Titanium tetrachloride and similar compounds readily form complexes with β-cyanopropionaldehyde, and these complexes may also be used as initiators. Suitable organometallic initiators include alkyl metal compounds, such as triethylaluminum, diethylmonochloro-aluminum, monoethyldichloro-aluminum, butyllithium, phenylmagnesium bromide, their complexes with titanium tetrachloride, titanium trichloride, alkali metal ketyls, and metal alkoxides which can be prepared by the reaction of alkyl metal compounds and aldehyde. The catalytic activity of the alkyl metal compound-titanium tetrachloride complexes varies with the ratio of the components. For example, triethylaluminum-titanium tetrachloride complex having a molar ratio of 2 to 1 of aluminum metal to titanium metal is more active than any other having molar ratios between 1 to 1 and 5 to 1.

The amount of initiator may be between about 0.001 mole and 0.1 mole per mole of β-cyanopropionaldehyde.

It has further been found that the polymerization initiated with organometallic compounds can be accelerated by water or an alcohol, such as methanol or ethanol, as co-catalyst and a polymer of higher molecular weight is obtained. The water or alcohol and organometallic compounds may be used in molar ratios between 0.1 to 1 and 2 to 1, and are preferably used in about equimolar amounts.

The optimum polymerization temperature varies with the activity of the initiator. When the polymerization of β-cyanopropionaldehyde is carried out at room temperature in the presence of boron trifluoride-diethyl etherate, the polymer formed is the cyclic trimer. In order to prevent the formation of the cyclic trimer, the polymerization temperature should be below 10° C., preferably below −10° C. Polymerization temperatures between −30° C. and −100° C. are preferred.

In performing the present process, it is desirable to use an inert organic solvent as the reaction medium in which the β-cyanopropionaldehyde, the initiator, and the co-catalyst, if any, are dissolved or dispersed, and which remains liquid at the polymerization temperature. Suitable organic solvent include tetrahydrofuran, toluene, tertbutanol, chloroform, methylene chloride, and dichloroethane.

The polymerization reaction of the present invention proceeds smoothly in a vacuum or an inert gas atmosphere, but it is not affected by the presence of air.

One-half day to several days are required for the completion of the polymerization reaction at the preferred low temperatures. Although the polymerization reaction is usually terminated spontaneously, the addition of stabilizers, such as pyridine or hydrazine, or the acylation or etherification of the terminal hemiacetal linkage of the polymer is effective in terminating the polymerization reaction and stabilizing the polymer formed. Polymerization may be terminated by pyridine-acetyl chloride, pyridine-acetic anhydride, hydrochloric acid-methanol, or acetone-acetic acid mixtures. However, even when treated with methanol alone, the linear polymer of β-cyanopropionaldehyde is stable, unlike polyoxymethylene.

When a Lewis acid is employed an initiator, the linear polymer obtained is a white, amorphous material having a melting point of 75° C. to 80° C. which is fairly soluble in organic solvents, such as methylene chloride, dimethylformamide, dimethylacetamide, or dimethylsulfoxide. When organometallic compounds alone or in combination with water or alcohol are used as initiators, the linear polymer obtained is a white, highly ordered crystalline solid which has a melting point of 130° C. to 160° C. or even higher and is only sparingly soluble in most organic solvents, and only paritally soluble in acetone, dimethylformamide, and dimethylsulfoxide. It may be fractionated by extraction with acetone into a soluble amorphous fraction and an insoluble crystalline polymer. The acetone-insoluble fraction can be further divided into two parts respectively soluble and insoluble in dimethylformamide or dimethylsulfoxide.

The crystallinity of the polymer may be increased by heat treatment, for example, 4 hours in boiling water and then 30 minutes in a vacuum of 1 mm. Hg at 160° C. prior to rolling into film. The crystalline structure was confirmed by X-ray oscillation pattern and by absorption bands at 1735 cm.$^{-1}$ and 1258 cm.$^{-1}$ in a dichromatic infrared spectrum.

When boiled in aqueous hydrochloric acid solution, the polymers are again converted to β-cyanopropionaldehyde. The 2,4-dinitrophenylhydrazone of β-cyanopropionaldehyde is obtained by boiling the polymers of the present invention in a solution of 2,4-dinitrophenylhydrazine in 2 N hydrochloric acid. This proves the polyacetal structure of the polymers. This is confirmed by their infrared absorption spectra, which lack the characteristic absorption bands of the aldehyde group at 1710 cm.$^{-1}$, 890 cm.$^{-1}$, 845 cm.$^{-1}$ and have a characteristic absorption band at 1134 cm.$^{-1}$ due to a C—O—C linkage.

The nitrile group of β-cyanopropionaldehyde does not normally take part in the polymerization reaction and remains intact in the polymers. When the polymers formed are colored, some nitrile groups are believed to participate in the polymerization reaction because absorption bands characteristic of the C=N— linkage are found at 1670 cm.$^{-1}$, 1520 cm.$^{-1}$ and 3350 cm.$^{-1}$ in the infrared absorption spectra of the products.

The following examples illustrate the present invention but it will be understood that the present invention is not limited to the examples.

The attached drawing shows typical infrared absorption spectra of six polymers of the invention respectively prepared by the methods of Examples I to VI.

Example I 10 grams methylene chloride and 0.3 ml. boron trifluoride-diethyl etherate were added to 10 g. β-cyanopropionaldehyde. The mixture was allowed to stand for four days in an evacuated sealed tube immersed in a Dry Ice-acetone bath. Thereafter, the tube was unsealed and 0.3 ml. cold pyridine was added, followed by 20 ml. of a 10 percent methylene chloride solution of acetyl chloride. Methanol was added to the reaction mixture until a white, amorphous product was precipitated. The product when purified by dissolution and reprecipitation, melted at 75–85° C. Its intrinsic viscosity was 0.22 measured in dimethylformamide at 25° C. The infrared absorption spectrum of the product in chloroform solvent is shown in FIG. 1.

Figure 2:
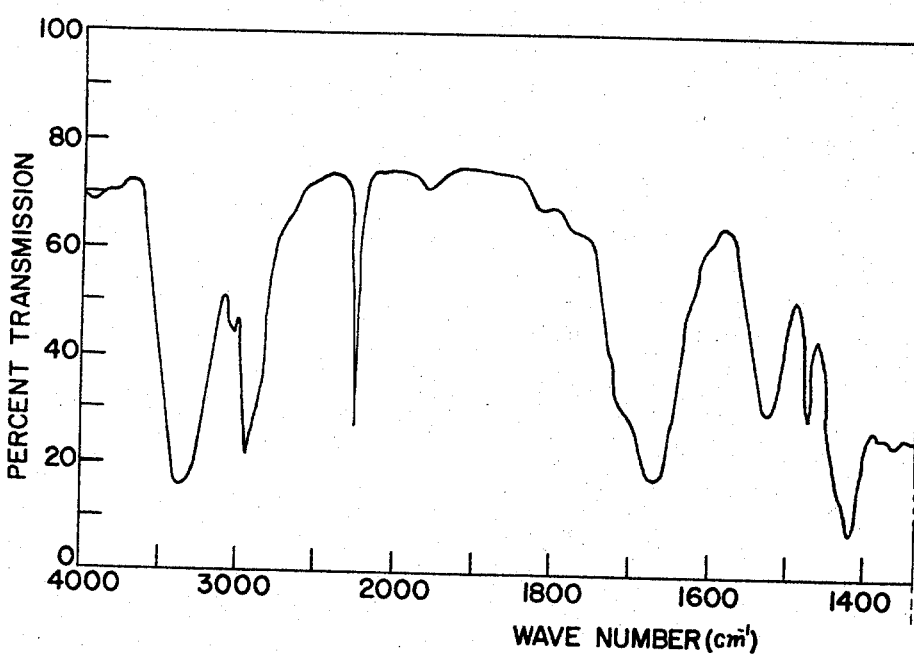
Figure 1A:
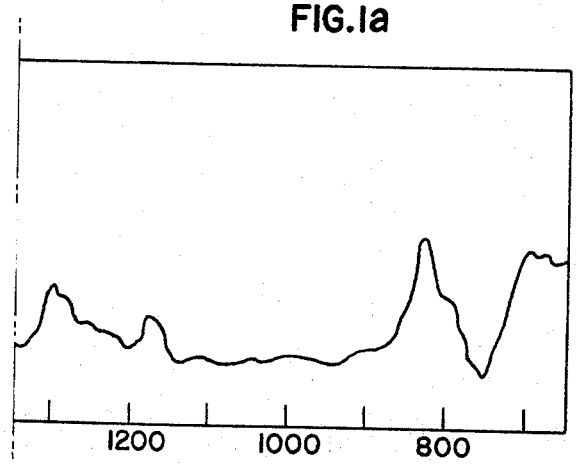
Figure 2A:
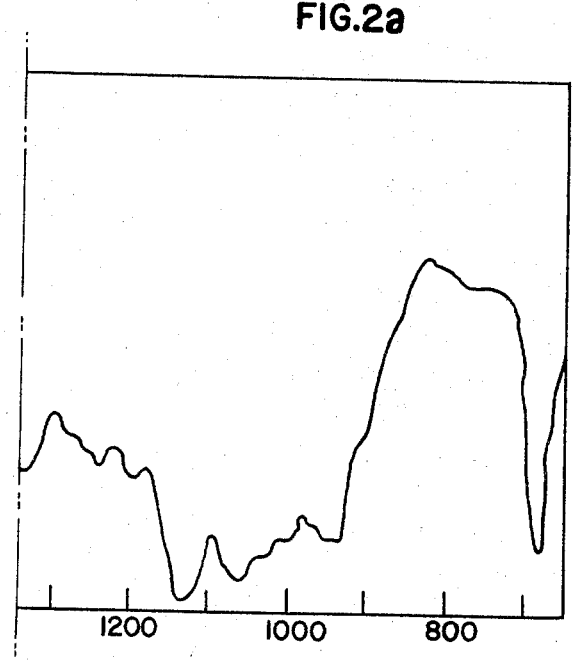

Example II 50 milligrams yellow, pulverized β-cyanopropionaldehyde-titanium tetrachloride complex were added to 6 g. β-cyanopropionaldehyde, and the mixture was allowed to stand for ten days in a vacuum sealed tube at room temperature (10° C.) A brown amorphous product was recovered after removal of unreacted β-cyanopropionaldehyde and titanium tetrachloride from the contents of the tube. The infrared absorption spectrum of the product in chloroform is shown in FIG. 2.

Figure 3:
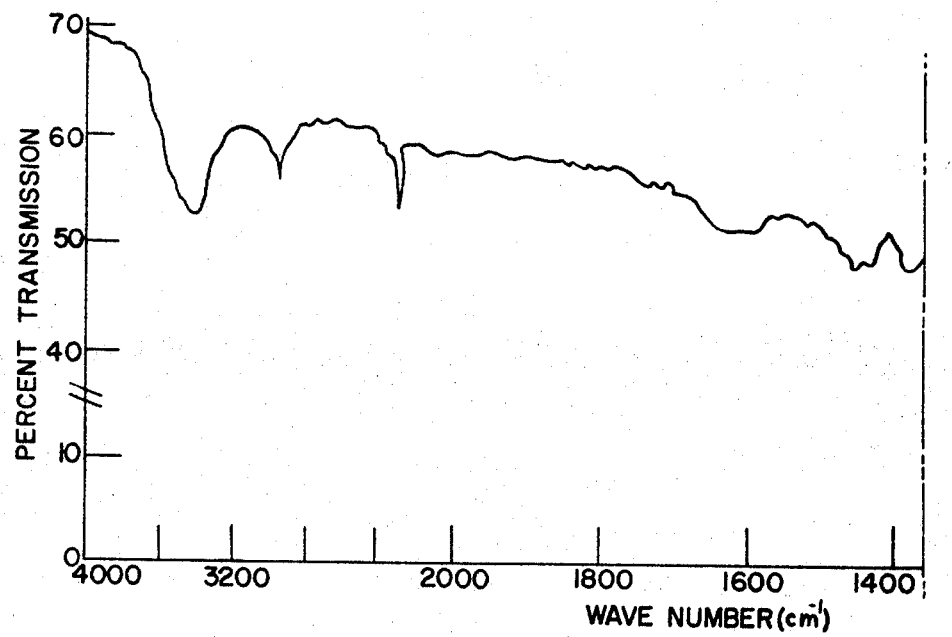

Example III 8.6 grams tetrahydrofuran and 0.7 g. triethylaluminum were added to 10 g. β-cyanopropionaldehyde, and the mixture was allowed to stand for three days in a vacuum sealed tube in a Dry Ice-acetone bath at −78° C. After the tube was unsealed, 3 ml. cold pyridine and thereafter 20 ml. of a 10 percent methylene chloride solution of acetyl chloride were added. Methanol was added last to precipitate the formed polymer. Yield: 5.5 g. This product was a white solid having a melting point of 131–133° C. and was identified as a polyacetal by its infrared absorption spectrum (see FIG. 3) and the preparation of the 2,4-dinitrophenylhydrazone.

Figure 4:
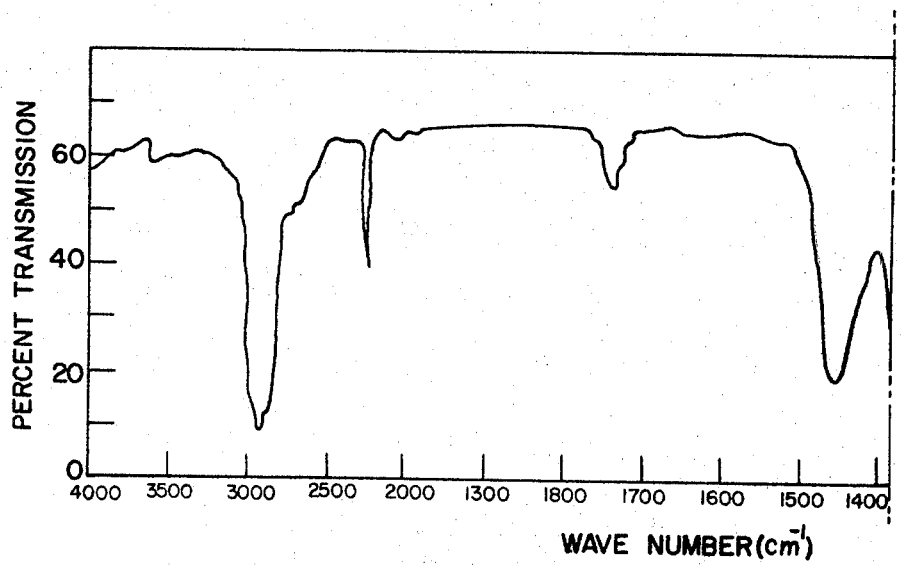
Figure 3A:
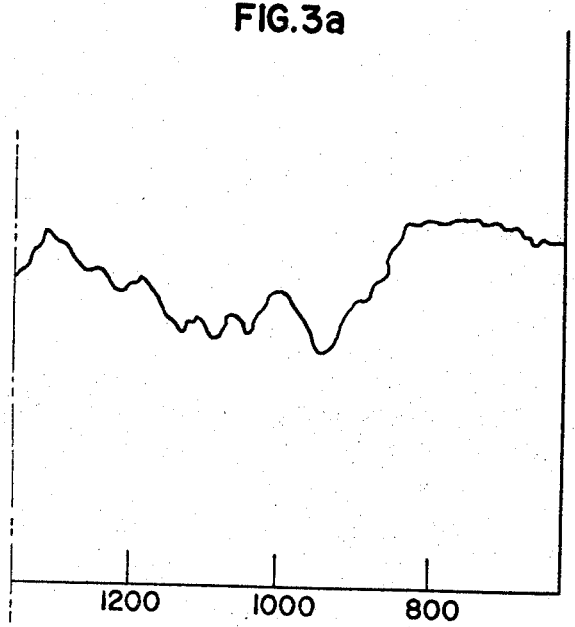
Figure 4A:
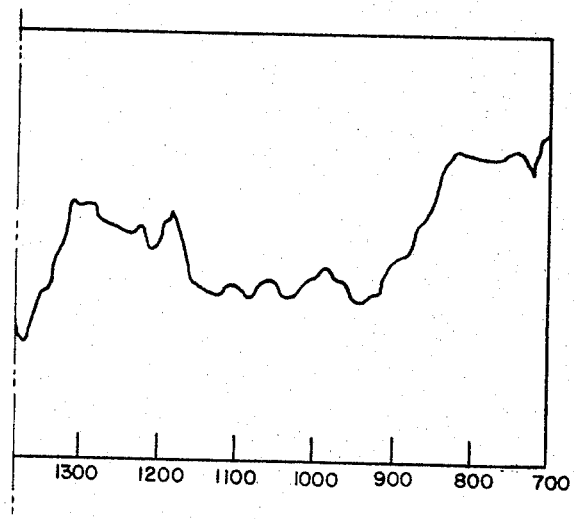

Example IV 10.3 g. methylene chloride and 0.7 g. diethylzinc were added to 10 g. β-cyanopropionaldehyde, and this mixture was allowed to stand for four days at −50° C. whereupon it was worked up as described in Example I to yield 2.2 g. of polymeric material which had almost the same appearance and properties as that of Example III. It was identified as a polyacetal from its infrared absorption spectrum (see FIG. 4).

Example V 10.3 g. methylene chloride were mixed in a reaction vessel, cooled to −78° C. with 0.7 g. diethylzinc and 0.1 ml. water, and 10 g. β-cyanopropionaldehyde were added. The mixture was allowed to stand for four days at −50° C. whereupon it was worked up as described in Example I to yield 3.5 g. of polymeric material.

Figure 5:
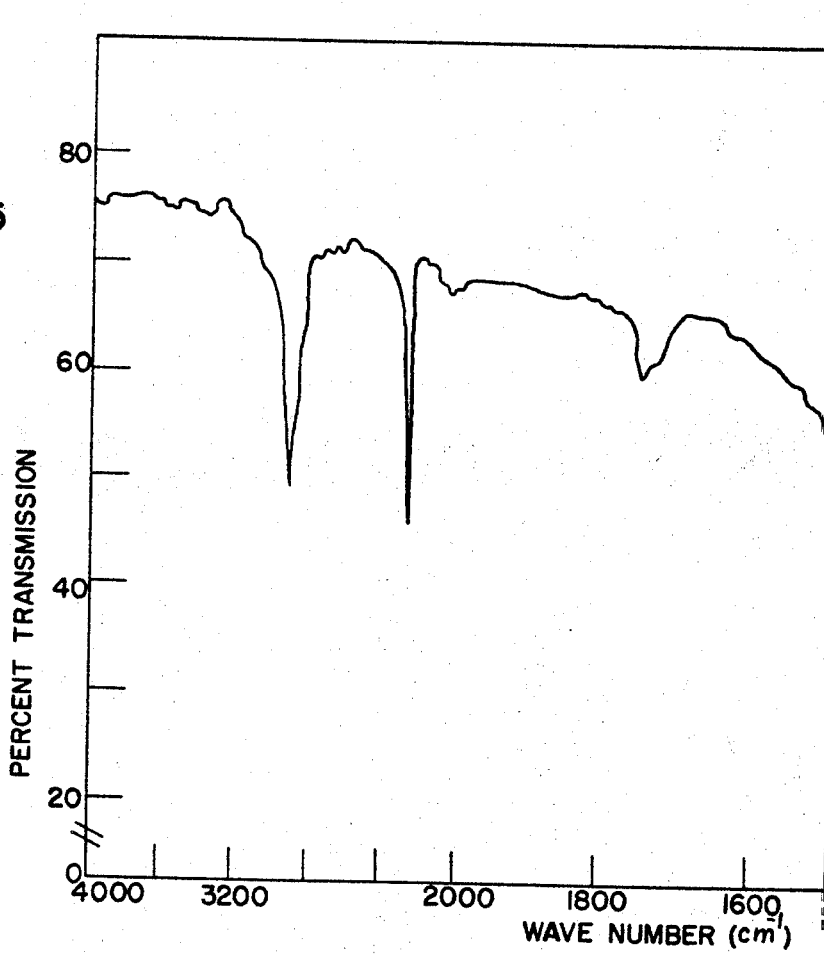

The reaction velocity and the yield were higher than in Example IV wherein water was not used as a co-catalyst. The infrared absorption spectrum of this product is shown in FIG. 5.

Figure 6:
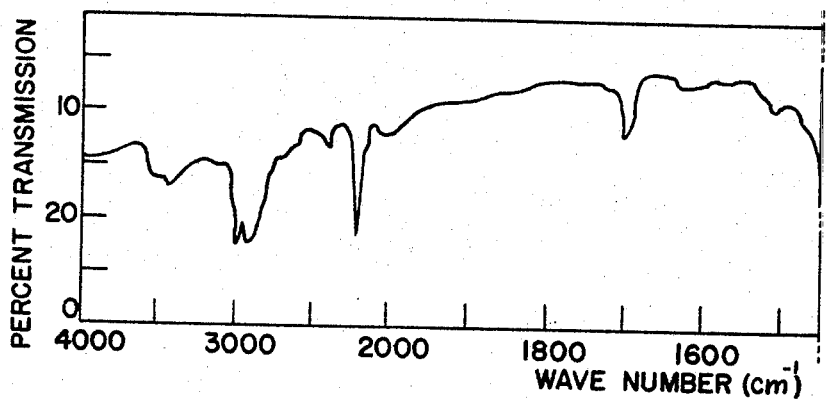
Figure 5A:
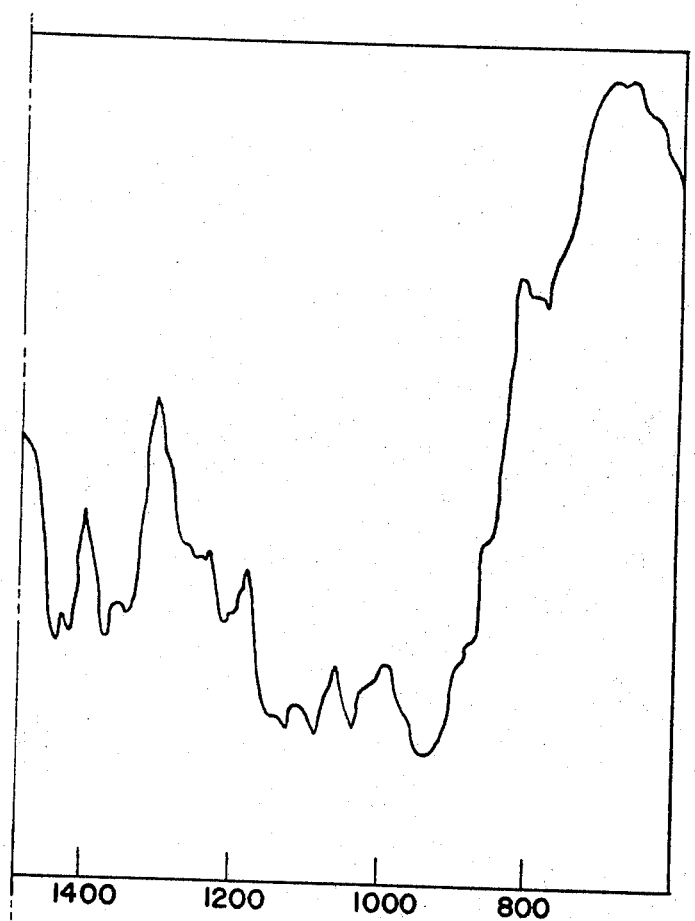
Figure 6A:
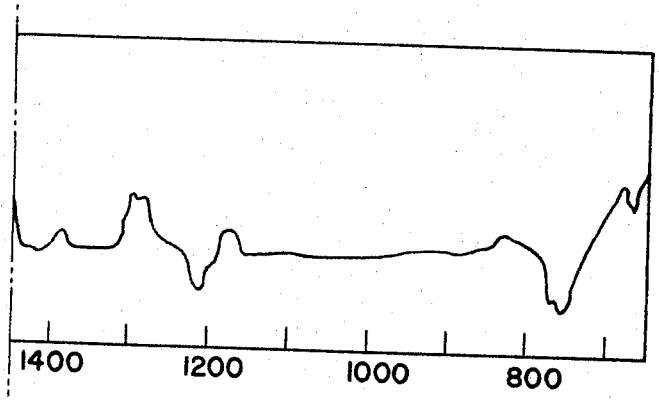

Example VI 10.3 g. methylene chloride contained in a tube cooled to −78° C. were mixed with 0.57 g. triethylaluminum and 0.46 g. of titanium tetrachloride, whereby a triethylaluminum-titanium tetrachloride complex having an Al:Ti ratio of 2 to 1 was formed. After 10 g. β-cyanopropionaldehyde had been added, the tube was deaerated and sealed. The sealed tube was allowed to stand for three days at −78° C. The reaction mixture was then worked up as described in Example I to yield 7.3 g. of polymeric material. The infrared absorption spectrum of this polymer in chloroform solvent is shown in FIG. 6.

Example VII 20.6 g. methylene chloride and 1.4 g. diethylzinc were added to 20 g. β-cyanopropionaldehyde, and the mixture was allowed to stand for four days at −78° C. It was then worked up as described in Example I to yield 6.94 g. of polymeric material. 95.8% of the polymer was soluble in acetone, 2.8% was insoluble in acetone and soluble in dimethylformamide, having a melting point of 155–165° C., and 1.4% was insoluble in dimethylformamide.

Example VIII 17.2 g. tetrahydrofuran and 0.3 g. triethylaluminum were added to 20 g. β-cyanopropionaldehyde, and the mixture was allowed to stand for three days at −78° C. whereupon it was worked up as described in Example III to yield 13.93 g. of polymeric material of which 88.6% was acetone soluble, 4.0% insoluble in acetone but soluble in dimethylformamide, and 7.4% insoluble in dimethylformamide and having a melting point of 160° C.–175° C.

What is claimed is:

1. A linear polymer of β-cyanopropionaldehyde having repeating units of the formula

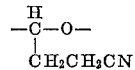

connected by acetal linkages.

2. A process for preparing a linear polymer of β-cyanopropionaldehyde by polymerizing β-cyanopropionaldehyde at a temperature lower than 10° C. in the presence of a cationic initiator selected from the group consisting of Lewis acids and organometallic compounds, said compounds being selected from lower alkyl and phenyl compounds of Group I–IV metals.

3. A process as set forth in claim 2, wherein said initiator is an organometallic compound, and said β-cyanopropionaldehyde is polymerized in the additional presence of water or a lower alkanol as a co-catalyst.

References Cited

UNITED STATES PATENTS 2,721,858  10/1955  Joyner et al. _____ 260—67

OTHER REFERENCES

Vogl: Journal of Polymer Science, vol. 46, No. 147, September 1960, pp. 261–4.

Furukawa et al.: Die Makromolekulare Chemie, vol. 37, April 1960, pp. 149–152.

Natta et al.: Ibid., pp. 156–159.

WILLIAM H. SHORT, *Primary Examiner.*

L. M. PHYNES, *Assistant Examiner.*